United States Patent [19]

Johnson

[11] 4,087,297
[45] May 2, 1978

[54] HAND HELD WELDING DEVICE, AND METHOD OF USING SAME
[75] Inventor: Charles A. Johnson, Rockingham, N.C.
[73] Assignee: Home Curtain Corporation
[21] Appl. No.: 815,523
[22] Filed: Jul. 14, 1977
[51] Int. Cl.² ............................................. B32B 31/20
[52] U.S. Cl. ................................. 156/73.4; 156/580.1; 228/1 R; 264/23
[58] Field of Search .................. 156/73.4, 580.1, 580.2; 228/110, 1 R; 264/23

[56] References Cited
U.S. PATENT DOCUMENTS 3,602,421   8/1971   Spratt .................................. 156/580.2
3,683,470   8/1972   McMaster ........................... 156/580.2

Primary Examiner—Edward G. Whitby
Attorney, Agent, or Firm—Charles E. Temko

[57] ABSTRACT

A hand-held ultrasonic welding device suitable for welding together a plurality of laminae formed at least partially of thermoplastic synthetic resinous materials. The device is particularly useful in the quilting of bedspreads and comforters, and is capable of sealing along a continuous line in accordance with preestablished patterns. Means is provided for adjusting the pressure effectively applied to the laminae being sealed to prevent burning through the same caused by excess delivery of power.

4 Claims, 4 Drawing Figures

HAND HELD WELDING DEVICE, AND METHOD OF USING SAME

BACKGROUND OF THE INVENTION

This invention relates generally to the field of electronic sewing of textile materials which are formed at least partially from thermoplastic resins in woven or quilted form, and more particularly to an improved means and method for accomplishing such sewing to simulate the effect of hand guided sewing.

In the manufacture of quilted comforters and bedspreads, it is common practice to hand guide the quilting operation, using conventional sewing machines so as to follow the outline of various forms printed or otherwise disposed on an outermost surface, for example outlines of flowers, leaves and the like. While the end result of this work is often highly attractive, the amount of hand labor required is prohibitively expensive, and such techniques are normally confined to custom work.

In an attempt to offer similar products to a broader market, devices have been developed which quilt goods in the piece, using ultrasonic energy to interconnect layers of material which are at least partially formed from thermoplastic materials. It is known in the art to simulate thread stitching by forming an anvil roller to include bar-like projections of a length approximating the length of a stitch. Unfortunately, owing to the width of the projection, the effect created is that of a very heavy thread, and the use of this technique is somewhat limited to novelty patterns. Such quilting cannot possibly follow a complicated pattern on the outer surface of the quilt because of registry problems. Devices used in this technique are sold inder the Trademark PINSONIC.

In an attempt to improve the above technique, where a moderate amount of additional hand labor is permissible, limited success has been achieved using a hand-held ultrasonic welding device which forms the horn in combination with a planar metallic plate carried by the worktable upon which the work pieces are disposed. These devices are relatively complicated in that they employ means for raising and lowering the horn with each simulated stitch, while incrementally advancing the welding device to follow the outline of a desired pattern. However, such devices have been exceedingly complicated in construction and operation, and have not found general acceptance in the art.

It has been determined that for many applications, a more satisfactory appearance can be obtained by using a continuous sealing line, rather than a simulated stitch. The problem of uniform advancement of the horn over the pattern is to some degree eliminated by the fact that the interconnection of the laminae is accomplished only with movement of the tool, and not by a bar seal of predetermined length which operates at a cyclic rate independent of the degree of traverse over the work piece. The width of the interconnected areas can be reduced, because of the continuous nature of the line of interconnection, and the resemblance to thread stitching accordingly enhanced when the completed product is viewed from a reasonable distance.

SUMMARY OF THE INVENTION

Briefly stated, the invention contemplates the provision of an improved hand guided ultrasonic horn particularly adapted to seal along a substantially continuous line over which it is manually guided by the operator. The operative tip of the horn is in the form of a small sphere which is adapted to be placed in contact with an uppermost surface of the laminated work piece. Surrounding the horn is a hollow transparent guide, the position of which relative to the horn is manually adjustable. The guide also contacts the work piece during operation, so that the relative degree of contact of the horn, and the sealing effect thereof is controllable. Thus, where the horn is able to be moved relatively rapidly over the pattern, as for example during the sealing of a straight line pattern, the horn may be allowed to contact the work piece with relatively greater pressure, since the period of time of contact over a given segment of the seal line is relatively shorter. The possibility of a burn through, with proper care, is therefore eliminated. On the other hand, in those areas of the pattern where the line is curved or undulating, and greater precision is required, the horn may be partially retracted into the guide, so that the guide sustains a greater degree of vertically applied pressure, and the welding action over a given incremental time span is correspondingly reduced. This adjustment permits the operator to transverse the pattern at a slower rate without burning the work piece, and without the necessity of adjusting the amount of power delivered by the horn.

BRIEF DESCRIPTION OF THE DRAWINGS

In the drawings, to which reference will be made in the specification, similar reference characters have been employed to designate corresponding parts throughout the several views.

FIG. 4 is a transverse sectional view as seen from the plane 4—4 in FIG. 1.

DETAILED DESCRIPTION OF THE DISCLOSED EMBODIMENT

Figure 1:
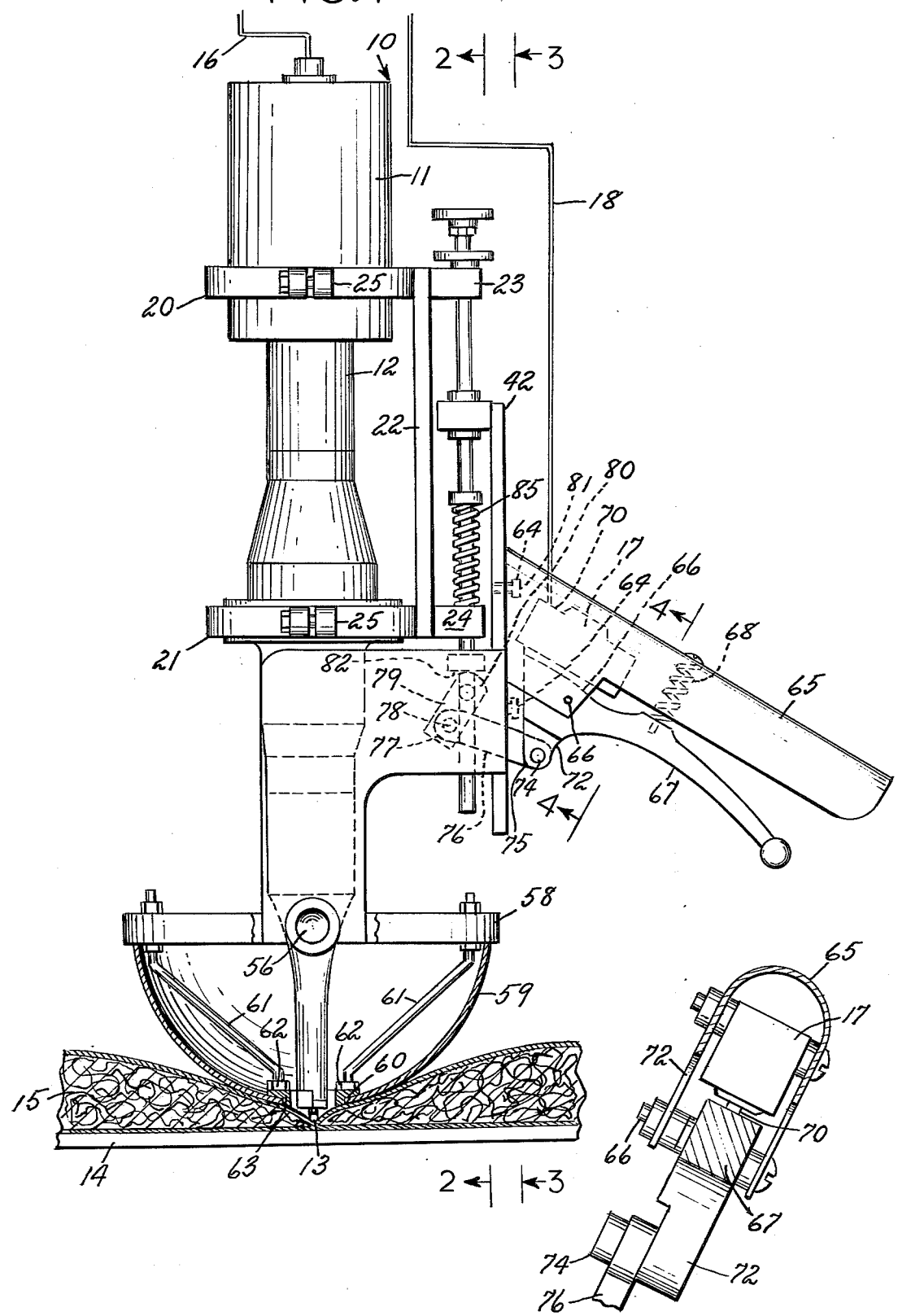
FIG. 1 is a fragmentary side elevational view of an embodiment of the invention.

In accordance with the invention, the device, generally indicated by reference character 10, includes an ultrasonic generator 11 of known type mounted upon an elongated shaft-like booster 12 which terminates in a hemispherical tip 13 which forms the horn. The device cooperates with a metallic tabletop 14 which supports a work piece 15 of well known type including a plurality of layers (not shown) at least partially formed of thermoplastic materials which are sealed over predetermined areas between the horn and the tabletop. The device 10 is essentially hand-held during operation, and receives power through a conductor 16 under the control of a switch 17 manually closed by an operator. The switch 17 is connected through the conductor 18 to a relay (not shown) in well known manner.

Figures 2, 3:
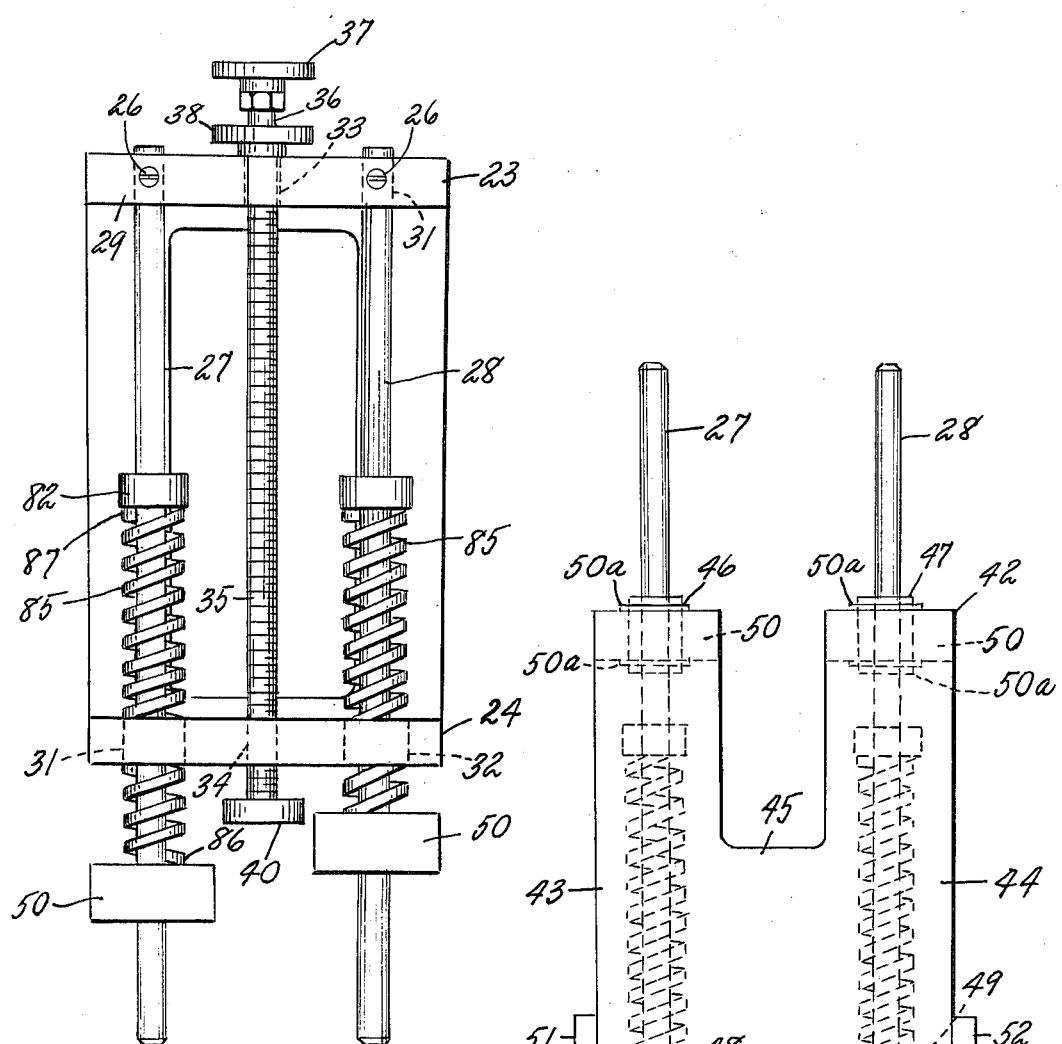
FIG. 2 is a vertical sectional view thereof as seen from the plane 2—2 in FIG. 1.
FIG. 3 is a vertical sectional view thereof as seen from the plane 3—3 in FIG. 1.

Secured to the generator 11 and housing 12 are an upper clamp 20 and a lower clamp 21 joined by an elongated plate 22. The plate 22 mounts upper and lower rod supports 23 and 24, respectively, (see FIG. 2) secured by bolts 25. Set screws 26 fix the position of a pair of elongated rods 27 and 28 which are positioned in bores 29, 30, 31 and 32. The supports 23 and 24 define a pair of aligned centrally disposed bores 33 and 34, the bore 34 being threaded and engaging a correspondingly threaded rod 35, the upper end 36 of which is provided with an adjusting member 37 and a lock nut 38. The lower end 39 mounts a cam follower or lifter 40.

Supported by the rods 27 and 28 is a sliding plate 42 of generally "H" shaped configuration, including a pair of elongated members 43 and 44 interconnected by a centrally disposed member 45. The members 43 and 44 mount a plurality of bushings 46, 47, 48 and 49 which slidably engage the rods 26 and 27. The bushings are mounted in brackets 50 and secured by retaining rings 50a.

Mounted on the plate 42, and preferably formed integrally therewith are a pair of side brackets 51 and 52, each including a horizontal portion 53 and a vertical portion 54, the lower ends 55 of which support a transverse shaft 56 mounting a manually engageable handle 57. The brackets 51 and 52 also support an annular ring 58 in turn mounting a transparent hemispherical guide 59 having a central opening 60 through which the tip 13 passes. A plurality of support rods 61 is carried by the ring 58, lower ends 62 thereof supporting a smaller ring 63 partially surrounding the opening 60.

A pair of bolts 64 mount a second handle or grip 65 on the plate 42. The handle 65 is hollow, and mounts a pintle 66 pivotally supporting an operating lever 67 for movement against a spring 68. A cam surface 69 cooperates with the follower 70 on the switch 17.

An extension 72 on the lever 67 mounts a pintle 74 engaging one end 75 of a link 76. The opposite end 77 of the link is interconnected by a pintle 78 to an eccentric member 79 on a pintle 80 supported by one of the brackets 50. The operative face 81 of member 79 bears against the lower surface 82 of the lifter 40.

Surrounding the rods 27 and 28 are a pair of springs 85, the lower ends 86 of which bear upon the bushings 48 and 49; and the upper ends 87 of which bear against adjustable set collars 82.

During operation, the device is normally held with the left hand of the operator on the handle 57, and the right on the handle 56 where it can engage the lever 67. In the absence of a squeezing effort on the lever, the switch 17 remains open.

During operation, a relatively small amount of movement will open the switch permitting operation to commence. When the device is placed as shown in FIG. 1, the weight of the device is supported by both the tip 13 and the guide 59. When patterns having straight lines are being traversed, the tip is allowed to project as shown in FIG. 1, since the device will be moved at a relatively rapid rate during the sealing operation.

When more difficult parts of the pattern are encountered, the operator squeezes the lever 67 less tightly, allowing the switch 17 to remain in its closed condition, and moving the eccentric member 79 such that the lifter 41 encounters a higher point on the eccentric member, which has the effect of lowering the position of the plate 42 relative to the lifter, and moving the guide 59 downwardly relative to the tip 13. The result of this action is to cause a greater amount of the total weight of the device to be supported by the guide, and a lesser amount by the tip, whereby the tip is moved away from the metallic tabletop 14, and the amount of power delivered to effect a sealing action is reduced. It should be mentioned that the actual movement involved is not great, and in most cases does not exceed 20 to 30 thousandths of an inch. For this reason, a rather high mechanical advantage is provided on the lever 67 to facilitate more precise adjustment.

I wish it to be understood that I do not consider the invention limited to the precise details of structure shown and set forth in this specification, for obvious modifications will occur to those skilled in the art to which the invention pertains.

I claim:

1. In an ultrasonic welding device including a hand-held horn adapted to be manually moved over a worktable forming a cooperating anvil, said horn communicating with a source of ultrasonic power, the improvement comprising: said horn having a generally axially positioned tip at a lower end thereof and a guide at least partially surrounding said tip and positioned to contact a workpiece disposed on said worktable; said guide being axially adjustable relative to said tip to vary the effective pressure of said tip upon said workpiece.

2. An ultrasonic welding device in accordance with claim 1, further characterized in the provision of manual gripping means on said horn, and means associated with said gripping means for adjusting the position of said guide relative to said tip.

3. An ultrasonic welding device in accordance with claim 2, further characterized in said last mentioned means including a pivotally mounted lever, and switch means carried by said gripping means; operation of said switch means being actuated by movement of said lever.

4. In the ultrasonic welding of a plurality of thermoplastic layers by positioning the same between a horn and an anvil, the steps of controlling the degree of ultrasonic power transmitted to said layers comprising: providing a guide at least partially surrounding said horn, and varying the relative position of said guide and said horn, whereby said guide contacts said layers to a varying degree to control the effective pressure of said horn upon said layers.

* * * * *